United States Patent [19]

Notardonato et al.

[11] Patent Number: 5,120,330
[45] Date of Patent: Jun. 9, 1992

[54] GAS EXCHANGE COLUMN

[75] Inventors: Luigi Notardonato, Park Ridge; Casimir Pulawski, Chicago; Gunnar Bjerklund, Rolling Meadows; William C. Ore, Elmhurst, all of Ill.

[73] Assignee: Universal Beverage Equipment, Inc., Willowbrook, Ill.

[21] Appl. No.: 677,257

[22] Filed: Mar. 29, 1991

[51] Int. Cl.$^5$ .............................................. B01D 19/00
[52] U.S. Cl. ........................................ 55/53; 55/193; 55/196; 261/113; 261/114.1
[58] Field of Search ................... 55/39, 44, 53, 169, 55/186, 193, 196; 261/113, 114.1

[56] References Cited

U.S. PATENT DOCUMENTS

| | | | |
|---|---|---|---|
| 1,738,870 | 12/1929 | Cox et al. | 261/113 |
| 1,782,735 | 11/1930 | MacKenzie | 261/113 |
| 1,951,885 | 3/1934 | Smith | 261/113 X |
| 2,310,829 | 2/1943 | Becker | 261/113 |
| 2,515,090 | 7/1950 | Linder | 261/113 X |
| 2,926,754 | 3/1960 | Ragatz | 55/196 X |
| 3,497,327 | 2/1970 | Kehse | 261/113 X |
| 4,184,857 | 1/1980 | Iijima et al. | 55/186 X |
| 4,352,682 | 10/1982 | Komp, Jr. et al. | 55/196 X |

FOREIGN PATENT DOCUMENTS

| | | | |
|---|---|---|---|
| 142786 | 9/1935 | Austria | 261/113 |
| 2202167 | 9/1988 | United Kingdom | 55/53 |

Primary Examiner—Robert Spitzer
Attorney, Agent, or Firm—Wood, Phillips, Mason, Recktenwald & Vansanten

[57] ABSTRACT

A column for removing a gas from a gas-containing liquid using a stripping gas has an enclosed shell having a side wall defining an inner periphery and a top and a bottom. A gas containing liquid inlet is provided proximate at the top of the shell for introducing a gas-containing liquid into the column. At least two adjacent parallel spaced apart substantially planar sieve plates, each sieve plate being oriented transverse the side wall of the shell and having an edge conforming substantially to the inner periphery of shell, are provided within the shell. The seive plates are perforated to facilitate the passing of the gas-containing liquid therethrough. A stripping gas inlet causes a stripping gas to flow between the adjacent sieve plates. Baffles are provided between adjacent sieve plates for directing the stripping gas to flow in a torturous path, the path being parallel to and between planes formed by the sieve plates. An outlet is provided for exhausting the stripping gas from between the adjacent sieve plates.

22 Claims, 2 Drawing Sheets

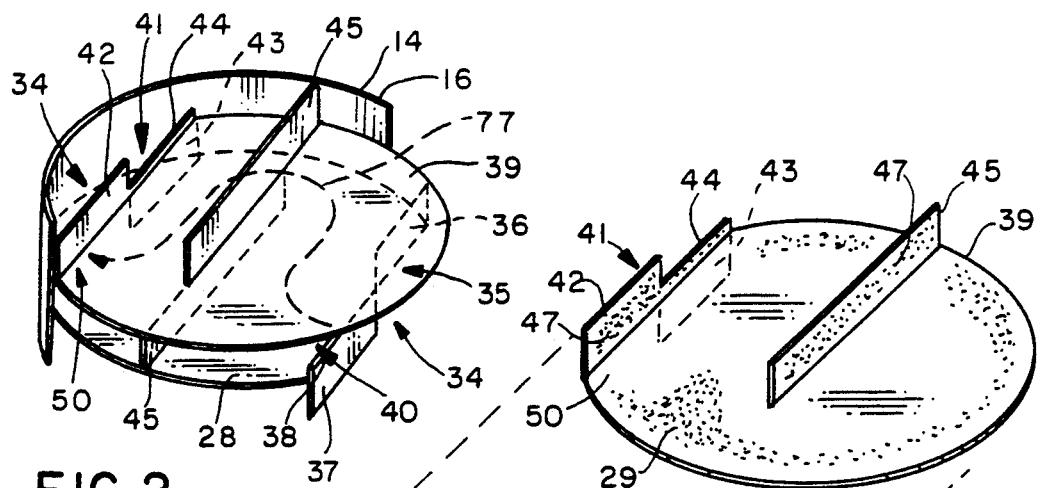
FIG. 2
FIG. 3
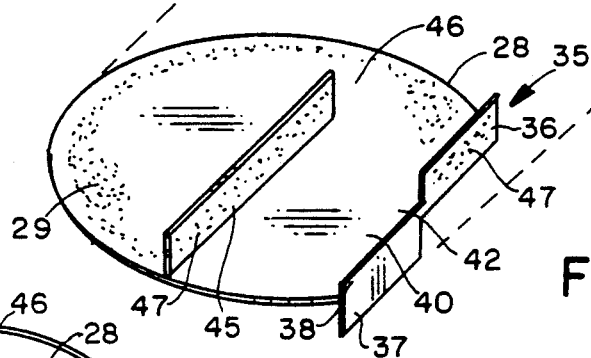
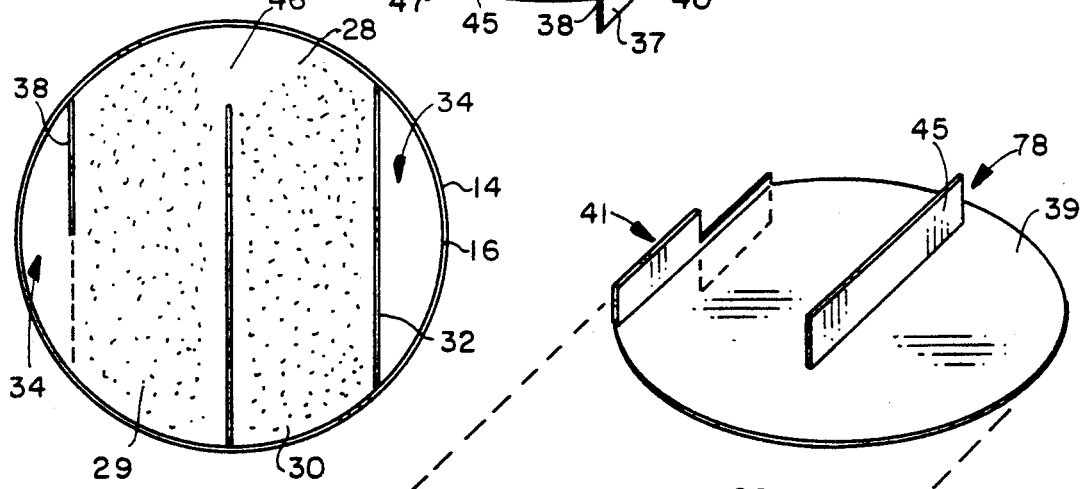
FIG. 4
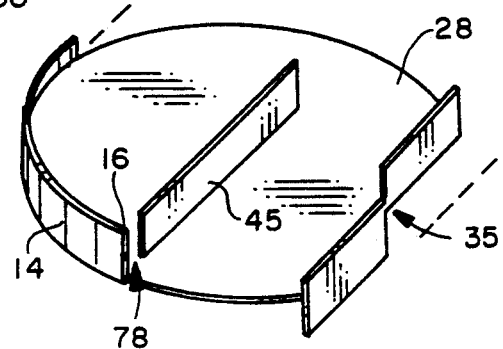
FIG. 5

GAS EXCHANGE COLUMN

TECHNICAL FIELD

The present invention is directed to a gas exchange column for removing a gas from a gas-containing liquid using a stripping gas, and more particularly to an apparatus and method for removing oxygen from oxygen-containing water. The apparatus and method can be employed, for example, for deoxygenating water used in the production of beverages such as soft drinks and beer.

BACKGROUND OF THE INVENTION

Deoxygenating apparatus for removing oxygen from water for use in manufacturing beverages are known in the art and generally consist of two types, a deoxygenating column and a deoxygenating tank. A deoxygenating column has a series of stacked deoxygenating units each having a perforated distributor plate and subjacent shallow perforated tray that cooperatively act to create droplets or streams of oxygen-containing water and to direct a stripping gas through the droplets or streams to provide intimate contact between the water and the stripping gas to strip the oxygen from the oxygen-containing water. A layer of water, preferably of uniform depth, forms on the perforated tray with water passing through the perforations forming the droplets or streams. A deoxygenating tank has a tank of oxygen-containing water through which a stripping gas is bubbled to permit the stripping gas to strip the oxygen therefrom. The present invention is more closely related to deoxygenating columns.

U.S. Pat. Nos. 4,358,296 to Notardonato, et al. and 4,265,167 to Mojonnier et al. illustrate deoxygenating columns. Both patents disclose a deoxygenating column having a plurality of stacked deoxygenating units disposed therein. The deoxygenating units consist of a perforated distributor plate defining a central opening therein connected to the inner periphery of the column. A shallow perforated tray is connected to the underside of the plate. The inner periphery of the column and the edge of the tray define an annular passageway. Oxygen-containing water introduced at the top of the column is distributed by the perforated distributor plate onto the tray. The oxygen-containing water is formed into droplets or streams as it passes from the distributor to the tray. A plurality of deoxygenating units are stacked to provide a number of vertical layers of droplets or streams of oxygen-containing water. A stripping gas introduced at the bottom of the column is at best caused to flow only in a vertical serpentine path between the distributor plates and perforated trays as it passes through the column. The stripping gas passes up through the annular passageway, across through the water and up through the central opening.

The deoxygenating columns described above have several problems. First, the structure of the deoxygenating units makes it difficult and expensive to build the column because the distributor plates must be fastened to the inner periphery of the column in a precisely horizontal alignment for the column to function properly.

In addition, after the stripping gas is caused to flow up the central opening it diffuses in all directions toward the annular passageway. Similarly, after the stripping gas flows up the annular passageway it flows in a diffuse stream towards the next central opening. As a result, a particular molecule of stripping gas passes through the streams or droplets of water for only a short distance equal to the length between the edge of the central opening and the annular passageway each time it moves between a distributor and tray. Thus, there is a very limited opportunity for each molecule of stripping gas to intimately contact the oxygen-containing water.

Also, such columns do not ensure that all the stripping gas will flow through the droplets or streams of oxygen-containing water. That is, if one of the distributor plates or trays is not horizontal the layer of oxygen-containing water may not form over an area of the plate or tray meaning no droplets or streams will flow underneath that area. Thus, the portion of the diffuse stream of stripping gas flowing underneath that area will fail to intimately contact any oxygen-containing water. Also, stripping gas can flow through the plate or tray at the area lacking a water layer and thereby bypass the droplets or streams of water.

Moreover, the above-described deoxygenating columns have only a vertical serpentine flow path with limited flow in a horizontal direction. However, only when the stripping is flowing horizontally does it intimately contact the oxygen-containing water. Thus, such deoxygenating columns fail to maximize the opportunity for the stripping gas to intimately contact the oxygen-containing water.

Finally, the above described deoxygenating columns introduce the stripping gas only at the bottom of the column meaning that by the time the stripping gas reaches the top of the column it contains a large amount of the stripped oxygen, decreasing the efficiency of the oxygen exchange process.

The present invention is directed toward overcoming one or more of the problems discussed above.

SUMMARY OF THE INVENTION

The present invention is directed to a gas exchange column for removing a gas such as oxygen from a gas-containing liquid such as oxygen-containing water using a stripping gas such as carbon dioxide. The column is constructed from an enclosed shell having a side wall defining an inner periphery and having a top and a bottom. A gas-containing liquid inlet is provided proximate the top of the shell for introducing a gas-containing liquid into the column. Within the shell are provided at least two adjacent parallel spaced apart substantially planar sieve plates. Each sieve plate is oriented transverse the side wall of the shell and has an edge substantially conforming to the inner periphery of the shell. The sieve plates are perforated to enable the passing of the gas-containing liquid therethrough. A stripping gas inlet introduces a stripping gas that flows between the adjacent sieve plates. Baffles are provided between adjacent sieve plates for directing the stripping gas to flow in a horizontal tortuous path, the path being parallel to and between the sieve plates. Passageways are provided for the stripping gas to travel vertically in the column. The passageways are defined by a truncated edge of the sieve plate and the inner periphery of the shell. The truncated edges of adjacent sieve plates are preferably about 180° out of alignment with each other. The passageways provide both an inlet between adjacent plates and an outlet between adjacent plates for the flow of stripping gas therebetween.

The baffles of the gas exchange column of the present invention can be perforated. An external pump for reducing the pressure within the column can be disposed in fluid communication with the top of the column for drawing the excess stripping gas and the stripped gas out of the column. Finally, a pipe that provides gas-containing liquid to the gas-containing liquid inlet can have a stripping gas sparger for introducing additional stripping gas into the gas-containing liquid prior to the introduction of gas-containing liquid to the gas exchange column.

Another aspect of the present invention is a method of removing gas from a gas-containing liquid using a stripping gas. An enclosed shell having a side wall defining an inner periphery and having a top and a bottom is provided. A plurality of substantially parallel spaced apart perforated sieve plates having an edge portion conforming substantially to the inner periphery of the side wall of the shell are also provided. The sieve plates have a truncated edge. The truncated edge and the side wall of the shell define a stripping gas passageway. The truncated edges of adjacent sieve plates are preferably about 180° out of alignment. The sieve plates further include a liquid confining lip proximate to the truncated edge. Between adjacent sieve plates are baffles for directing a stripping gas in a tortuous horizontal path. The sieve plates are configured to receive the gas-containing liquid thereon. A gas-containing liquid is introduced proximate the top of the shell. The gas-containing liquid is percolated through the perforated sieve plates at a rate sufficient to cause a discrete flow of gas-containing liquid to flow downwardly from sieve plate to sieve plate at the same time leaving a pool of water on each sieve plate. A stripping gas is introduced proximate the bottom of the column and caused to flow in counterflow to the gas-containing liquid. The stripping gas is directed to flow into the stripping gas passageway of each sieve plate and then directed to flow in a tortuous path, the path being parallel to and between the adjacent sieve plates and through the discrete flow to provide an exchange of stripping gas for the gas of the gas-containing liquid.

Preferably, the baffles are perforated which causes the gas-containing liquid to flow thereover and form a thin sheet of gas-containing liquid over substantially each of the perforations. Some of the stripping gas is then caused to flow over the sheets and some of the stripping gas flows through the perforations and the sheet to enhance the exchange of stripping gas for the gas of the gas-containing liquid.

A pipe that provides gas-containing liquid to the gas-containing liquid inlet can also be provided with a sparger column for introducing additional stripping gas to the gas-containing liquid prior to introducing the gas-containing liquid to the gas exchange column to further enhance removal of the gas from the gas-containing liquid.

Fresh stripping gas can be introduced at more than one location between the bottom and the top of the shell to provide a greater concentration of stripping gas throughout the shell.

Finally, a pump for reducing pressure within the column, the pump being in fluid communication with the top of the column, can be added for drawing the stripping gas and the stripped gas out of the column.

The above-described gas exchange column is easy and inexpensive to build because the sieve plates and baffles can be aligned and assembled together before inserting them into the shell. In addition, the column defines a concentrated flow of stripping gas by forcing substantially the entire stream of stripping gas to flow in a focused path between sieve plates. Thus, virtually every molecule of stripping gas flows through the discrete flow of gas-containing liquid as the concentrated flow of stripping gas flows between adjacent sieve plates. The focused path of the stripping gas is also more tortuous as the stripping gas moves horizontally between the sieve plates, increasing the opportunity for the stripping gas to intimately contact the gas-containing liquid over the opportunity provided by prior art devices with short horizontal flows. The tortuous, focused path of the stripping gas causes all the stripping gas to be directed through the gas-containing liquid even if the sieve plates are not perfectly horizontal. The opportunity for intimate contact is further enhanced by the perforated baffles. Gas-containing liquid flows over the perforations and forms thin sheets. Stripping gas passes over or through the thin sheets providing the greater opportunity for intimate contact. Finally, the gas-exchange column of the present invention provides a greater concentration of fresh stripping gas between the top and bottom of the column to further improve the efficiency of the gas exchange column.

Still other aspects and advantages of the present invention can be obtained from a study of the detailed description of the preferred embodiments, the drawings, and the appended claims.

BRIEF DESCRIPTION OF THE DRAWINGS

FIG. 2 is a perspective view of two adjacent sieve plates of the gas exchange column of the present invention with shell cut away;

FIG. 3 is an exploded perspective view of two of the sieve plates of the gas exchange column of the present invention illustrated in FIG. 2;

FIG. 4 is a cross section of the gas exchange column of the present invention taken along 4—4 of FIG. 1; and FIG. 5 is an exploded perspective view of an alternate embodiment of two of the sieve plates of the gas exchange column of the present invention.

DETAILED DESCRIPTION OF THE PREFERRED EMBODIMENT

Figure 1:
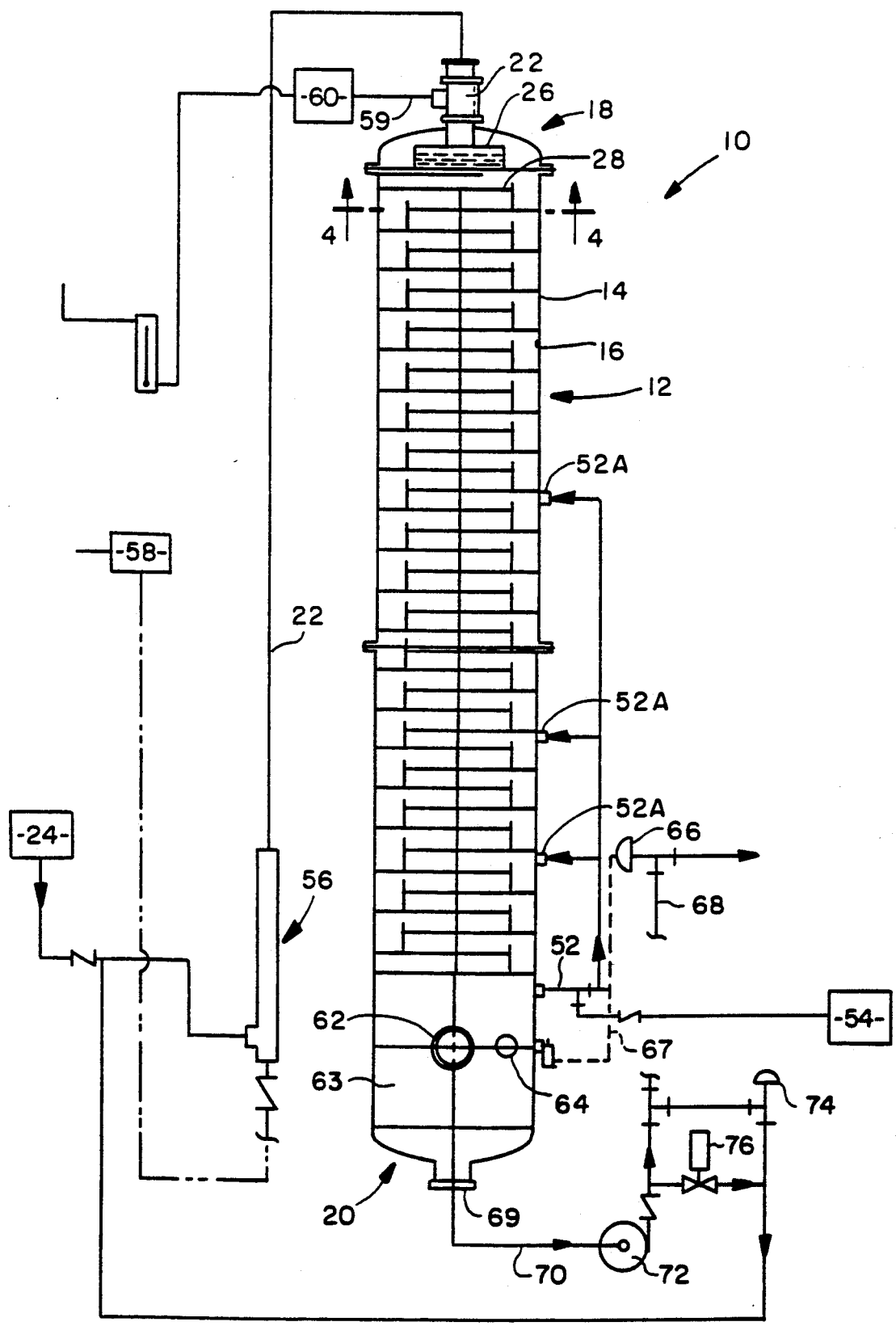
FIG. 1 is a diagram showing in schematic form the gas exchange column of the present invention with the interior of the column illustrated in a fragmentary sectional view.

The gas exchange column 10 of the present invention is best seen in FIG. 1. An enclosed shell 12 has a side wall 14 defining an inner periphery 16. The enclosed shell 12 also has a top 18 and a bottom 20. Preferably, the enclosed shell 12 is cylindrical, although other geometric shapes may be acceptable.

A conduit 22 for supplying a gas-containing liquid is located at the top 18 of the enclosed shell 12. The conduit 22 is in fluid communication with a gas-containing liquid supply 24. A diffuser 26 is in fluid communication with the conduit 22. The diffuser 26 functions to distribute the gas-containing liquid evenly over the cross-section of the enclosed shell 12 in discrete flow effective to facilitate interaction of the water with a stripping gas.

The term "discrete flow," as used herein in its various grammatical forms, identifies droplets or thin streams of liquid that increase the surface area of the gas-containing liquid exposed to the stripping gas to increase intimate contact therebetween and facilitate gas removal from the gas-containing liquid.

A plurality of sieve plates 28 having perforations 29 are disposed substantially uniformly between the top and bottom of the enclosed shell 12. The sieve plates 28 are substantially planar and stacked in a parallel spaced relationship. As best illustrated in FIGS. 2 and 4, the sieve plates 28 have an edge portion 30 which conforms to substantially the entire inner periphery 16 of the side wall 14. A truncated edge portion 32 together with the inner periphery 16 of the side wall 14 defines a stripping gas passageway 34 for the flow stripping gas and the gas removed from the gas-containing liquid therethrough. As illustrated in FIG. 4, the passageway 34 serves as both an inlet for supplying stripping gas between adjacent sieve plates 28 and an outlet for exhausting the stripping gas from between adjacent sieve plates 28.

Referring to FIGS. 2 and 3, an end baffle 35 has an upwardly extending baffle 36 and a diagonally opposed downwardly extending baffle 37 and an upwardly extending lip 38 having a height less than that of the upwardly extending baffle 36. An adjacent sieve plate 39 located above the sieve plate 28 has a configuration equivalent to the sieve plate 28 including an end baffle 41 having an upwardly extending baffle 42 and the downwardly extending baffle 43 and an upwardly extending lip 44, except the adjacent sieve plate 39 is rotated about 180° from the sieve plate 28. The sieve plate 28 and the adjacent sieve plate 39 in FIGS. 2 and 3 are merely illustrative of each adjacent pair of sieve plates between the top and bottom of the enclosed shell 12, with each sieve plate generally referred to by reference number "28".

The inner periphery 16, the upwardly extending baffle 36, the lip 38 and the bottom of the adjacent sieve plate 39 define a first gas opening 40 when the sieve plate 28 and the adjacent sieve plate 39 are in a parallel stacked relationship.

Similarly, the downwardly extending baffle 43 of the adjacent sieve plate 39 along with the top of the sieve plate 28 and the bottom adjacent sieve plate 39 and the inner periphery 16 define a second gas opening 50 when the sieve plate 28 and the adjacent sieve plate 39 are in a parallel stacked relationship.

An intermediate baffle 45 is located on each sieve plate 28 (including, of course, the adjacent sieve plate 39 of FIGS. 2 and 3), preferably at the center of the sieve plate 28. The intermediate baffle 45 and the inner periphery 16 of the side wall 14 together with the top of the sieve plate 28 and the bottom of the adjacent sieve plate 39 define a gas duct 46 when the sieve plate 28 and the adjacent sieve plate 39 are in a parallel stacked relationship.

As illustrated in FIGS. 2 and 3, in the preferred embodiment, the first gas opening 40 and the second gas opening 50 are disposed substantially 180° opposite each other with the intermediate baffle 45 therebetween. The gas duct 46 is disposed between the upwardly extending baffle 36 and the downwardly extending baffle 43 of the adjacent sieve plate 39.

The end baffle 35 of the sieve plate 28 and the end baffle 41 of the adjacent sieve plate 39 and the intermediate baffle 45 preferably include perforations 47, although the invention may be practiced without perforated baffles. The preferred embodiment contemplates that the upwardly extending lips 38 and 44 are not perforated, but these lips may be perforated.

As seen in FIGS. 2, 3 and 4, that portion of the sieve plate 28 and the adjacent sieve plate 39 (indeed, all the sieve plates are generally referred to by reference number "28") which overlie the gas passageways 34 are preferably not perforated. However, the portion of the sieve plates can be perforated without significantly effecting the operation of the gas exchange column.

Referring to FIG. 1, proximate the bottom 20 of the enclosed shell 12 is a first gas inlet jet 52 for supplying a stripping gas into the gas exchange column 10. The gas inlet jet 52 is connected to a stripping gas supply 54. In a preferred embodiment, a plurality of gas inlet jets 52A are positioned longitudinally along the enclosed shell 12 and therefore disposed between the top 18 and the bottom 20.

A stripping gas sparger 56 is preferably in fluid communication with the conduit 22 and positioned between the gas-containing liquid supply 24 and the top 18 of the enclosed shell 12. A stripping gas supply 58 is in fluid communication with the sparger 56 for supplying stripping gas to the sparger 56.

Those skilled in the art will realize that control and relief valves may be disposed between the supply 54 and the jet 52 and between the stripping gas supply 58 and the sparger 56; however, these have been omitted from FIG. 1 for clarity.

An excess stripping gas and removed gas exhaust pipe 59 draws the excess stripping gas and removed gas from the enclosed shell 12. A vacuum pump 60 for reducing pressure within the column is preferably in fluid communication with the top 18 of the enclosed shell 12 along the gas exhaust pipe 59.

Located proximate the bottom 20 of the enclosed shell 12 is a sight glass 62 for visually observing the level of a reservoir 63 of the stripped liquid (i.e., the gas-containing liquid with the gas removed) within the bottom 20 of the enclosed shell 12. Also proximate the bottom 20 of the enclosed shell 12 is a float 64. The float 64 is operatively associated with an outlet control valve 66 by a control line 67. An overflow pipe 68 is in turn connected to the outlet control valve 66 for discharging excess stripped liquid from the enclosed shell 12.

Located at the bottom 20 of the enclosed shell 12 is a stripped liquid outlet 69. An outlet pipe 70 is in fluid communication with the stripped liquid outlet 69 and a pump 72. Control valves 74 and 76 are in fluid communication with the outlet pipe 70 for causing the stripped liquid to be recirculated through the gas exchange column 10 to allow the gas content in the gas-containing liquid to be reduced to a desired level. Alternatively, the stripped liquid can be pumped by the pump 72 through the outlet pipe 70 for further processing.

FIG. 5 illustrates an alternate embodiment of the present invention. The intermediate baffle 45, the top of the sieve plate 28, the bottom of the adjacent sieve plate 39 and the inner periphery 16 of the side wall 14 define a second duct 78 of a size less than the duct 46.

In the operation of the preferred embodiment of the gas exchange column 10, gas-containing liquid from a gas-containing liquid supply 24 is introduced to the top 18 of the enclosed shell 12 through the conduit 22. The gas-containing liquid is then distributed over the top surface of a sieve plate, for example, the adjacent sieve plate 39 of FIGS. 2 and 3, by means of the diffuser 26. The gas-containing liquid is caused to pool to a depth sufficient to cause discrete flow to flow downwardly from the adjacent sieve plate 39 to a sieve plate 28. A pool depth on the sieve plates 28 of approximately one-half inch of gas-containing liquid has been found to yield acceptable results. The gas-containing liquid then flows in a discrete flow between sieve plates 28 from the top 18 to the bottom 20, i.e., along the longitudinal extent of the enclosed shell 12.

The stripping gas is simultaneously introduced at the gas inlet jet 52 located proximate the bottom 20 of the enclosed shell 12. The stripping gas flows in counterflow to the direction of travel of the gas-containing liquid from the gas inlet jet 52 to the exhaust pipe 59. The vacuum pump 60 in fluid communication with the top 18 of the enclosed shell 12 may be used to enhance the flow of the stripping gas and removed gas through the enclosed shell 12.

In a preferred embodiment, a plurality of inlet jets 52A are distributed between the top 18 and the bottom 20 of the enclosed shell 12. By supplying the stripping gas at varying points along the longitudinal extent of the enclosed shell 12, purer stripping gas is available for removing gas from the gas-containing liquid along the longitudinal extent of the enclosed shell 12, thereby improving the efficiency of the gas exchange column 10.

The stripping gas intimately contacts gas-containing liquid in at least three principal ways. Referring to FIGS. 2 and 3, the stripping gas flows vertically up the gas passageway 34 and through the gas opening 40 and enters between the sieve plate 28 and the adjacent sieve plate 39. The stripping gas then flows in a concentrated flow through the duct 46 and out the second gas opening 50. Thus, as seen in FIG. 2, the stripping gas flows in a concentrated flow along a focused, horizontal, tortuous or generally U-shaped pattern 77 between the sieve plate 28 and the adjacent sieve plate 39. In addition, the stripping gas flows in a generally vertical serpentine path through and between the gas passageways 34 oriented substantially 180° out-of-phase with adjacent passageways 34. Concurrently, the gas-containing liquid flows in discrete flow from the adjacent sieve plate 39 to the sieve plate 28. Thus, as the stripping gas flows in its concentrated flow along its focused, horizontal generally U-shaped 77 or tortuous path, virtually each molecule of stripping gas is caused to intimately contact the discrete flow of gas-containing liquid, providing an opportunity for stripping gas and gas exchange. The focused horizontal U-shaped flow pattern 77 increases the opportunity for the stripping gas to interact with the gas-containing liquid as compared to the opportunity provided by prior art devices with a diffuse vertical serpentine flow path of the stripping gas.

The second way stripping gas intimately contacts with the gas-containing liquid is by action of the stripping gas passing through the perforations of the perforated sieve plates 28 (e.g., the sieve plate 28 and the adjacent sieve plate 39 of FIGS. 2 and 3) and bubbling through the gas-containing liquid pool on top of the plurality of sieve plates 28.

A third way stripping gas is caused to intimately contact the gas-containing liquid involves the perforations in the preferred embodiment of the baffles 35, 41 and 45. As the gas-containing liquid flows down through the enclosed shell 12, gas-containing liquid flows in thin sheets over the perforations of the perforated baffles 35, 41 and 45. As the stripping gas is propelled through the enclosed shell 12, some of the stripping gas will be forced through or over the thin sheets of gas-containing liquid, further enhancing the exchange of stripping gas for the gas of the gas-containing liquid for oxygen.

After the stripping gas has been cycled through the enclosed shell, it is withdrawn from the enclosed shell 12 by the exhaust pipe 59. A vacuum pump 60 for reducing pressure can be provided in fluid communication with the top 18 of the enclosed shell 12 along the exhaust pipe 59 to facilitate the flow of stripping gas and removed gas through the enclosed shell 12 by reducing the pressure in the exhaust pipe 59 relative to the pressure in the rest of the enclosed shell 12.

In an alternate embodiment illustrated in FIG. 5, the second duct 78 improves the circulation of the stripping gas between the sieve plates 28 and 39. Circulation is improved because the stripping gas forced through the second duct 78 eliminates "dead spots" where stripping gas might not otherwise flow. Thus, the majority of the stripping gas flows in a generally "U" shaped flow pattern and the remaining stripping gas flows from the opening 44 through the second duct 78 and then through the second gas opening 50 in a linear flow path.

After the gas-containing liquid has passed through the longitudinal extent of the enclosed shell 12, it becomes stripped liquid and is collected in the reservoir 63 at the bottom 20 of the enclosed shell 12. The sight glass 62 provides for visual observation of the depth of the stripped liquid reservoir 63. The float 64 is operatively associated with the outlet control valve 66 in a manner well-known in the art to prevent the level of the reservoir 63 from rising above a desired point. If the level of the stripped liquid rises too high the float causes the valve to open, causing stripped liquid to flow into the overflow pipe 68.

The stripped liquid may also be drawn through the stripped liquid outlet 69 and through the outlet pipe 70 by action of the pump 72 to supply stripped liquid for further processing. The valves 74 and 76 allow the stripped liquid to be recycled through the exchange column 10 in order to bring the content of the stripped liquid to the desired level.

The sieve plates 28 of the present invention can be fastened together, such as by welding, prior to inserting the sieve plates 28 into the enclosed shell 12. Construction in this manner is made possible because the upwardly extending baffle 36 and the intermediate baffle 45 of the sieve plate 28 and the downwardly extending baffle 43 of the adjacent sieve plate 39 (see FIGS. 2, 3 and 5) function to support sieve plate 28 and adjacent sieve plate 39 in their parallel spaced relationship. Once the sieve plates 28 are inserted into the enclosed shell 12 they can be secured within by any convenient means, including welding.

As will be understood by those skilled in the art, the gas exchange column of the present invention can be used with many combinations of gas-containing liquids and stripping gases. The stripping gas must have a partial pressure such that it will replace the gas to be removed. In deoxygenating water for use in beverages, carbon dioxide or nitrogen are preferred stripping gases.

Those skilled in the art will also appreciate that while in the foregoing the exhaust pipe was located at the top of the column and inlet jet was located proximate the bottom of the column, the relative location of the exhaust pipe and inlet jet could be reversed because the stripping gas will flow in any direction provided the pressure at the exhaust pipe is less than the pressure of the inlet jet.

The present invention has numerous advantages over prior art devices. The focused horizontal tortuous flow path of the stripping gas as it passes between adjacent sieve plates maximizes the interaction of the stripping gas with the discrete flow of gas-containing liquid passing through the sieve plates. The focused stripping gas path prevents stripping gas from passing through the column without intimately contacting the gas-containing liquid, even if the sieve plates are not horizontally aligned. In addition, the opportunity for gas exchange beyond that available in the prior art is provided because the stripping gas is forced to pass through or over thin sheets of water formed over perforations in the baffles. Introduction of the stripping gas at various points along the longitudinal extent of the enclosed shell provides a purer stripping gas supply for more efficient removal of gas from the gas-containing liquid. The vacuum pump in fluid communication with the top of the enclosed shell provides a positive flow of stripping gas and removal gas to further improve the efficiency of the gas exchange column. Moreover, providing the stripping gas sparger enhances the interaction of stripping gas with the gas-containing liquid, further improving the efficiency of the gas exchange column. Finally, the column is relatively simple and inexpensive to build because the sieve plates may be assembled outside the enclosed shell and then inserted therein.

We claim:

1. A method of removing a gas from a gas-containing liquid using a stripping gas comprising:
   providing an enclosed shell having a side wall defining an inner periphery and having a top and a bottom;
   providing a plurality of substantially parallel spaced apart perforated sieve plates having an edge portion conforming substantially to the inner periphery of the side wall of the shell and a truncated edge portion, the truncated edge portion and the side wall of the shell defining a stripping gas passageway, the sieve plates further having a liquid confining lip proximate the truncated portion;
   forming a pool of the gas-containing liquid on the sieve plates;
   introducing the gas-containing liquid proximate the top of the shell;
   percolating the gas-containing liquid through the perforated sieve plates at a rate sufficient to form discrete flow of gas-containing liquid to flowing downwardly from sieve plate to sieve plate and at the same time leaving a pool of gas-containing liquid on each sieve plate;
   introducing a stripping gas proximate the bottom of the column in counterflow to the gas-containing liquid;
   providing between adjacent sieve plates tortuous path means for creating a tortuous stripping gas flow path, the path being parallel to the adjacent sieve plates and between the adjacent sieve plates and through the discrete flow of gas-containing liquid; and
   removing at least a portion of the gas from the gas-containing liquid by causing the stripping gas to flow into the stripping gas passageway of each sieve plate and then directing the stripping gas to flow into the tortuous path means.

2. The method of claim 1 wherein the tortuous path means comprises baffles between each adjacent sieve plate.

3. The method of claim 2 further comprising:
   providing perforations in the baffles for causing the gas-containing liquid to flow thereover and form thin sheets of gas-containing liquid over substantially each perforation; and
   removing at least a portion of the gas from the gas-containing liquid by directing the stripping gas to flow through or over substantially each perforation and the sheets of gas-containing liquid formed thereover.

4. The method of claim 2 further comprising the step of introducing stripping gas into the means for supplying the gas-containing liquid by providing a sparger column in fluid communication with the means for supplying the gas-containing liquid.

5. The method of claim 2 further including a step of introducing the stripping gas at more than one point between the bottom and the top of the shell.

6. The method of claim 2 further comprising the step of reducing pressure within the top of the column for drawing the stripping gas and stripped gas out of the column by providing pressure reducing means being in fluid communication with the top of the column.

7. A gas exchange column for removing a gas from a gas-containing liquid using a stripping gas, the gas exchange column comprising:
   an enclosed shell having a side wall defining an inner periphery and having a top and a bottom;
   a means for supplying a gas-containing liquid into the shell proximate the top of the shell;
   at least two adjacent, parallel, spaced apart, substantially planar sieve plates, each sieve plate being oriented transverse the side wall of the shell, each sieve plate having an edge conforming substantially to the inner periphery of the shell;
   means for passing the gas-containing liquid through each sieve plate in a discrete flow;
   means for supplying the stripping gas between the adjacent sieve plates;
   means for directing the stripping gas to flow in a tortuous path through the discrete flow, the path being parallel to and between the adjacent sieve plates; and
   means for exhausting the stripping gas from between the adjacent sieve plates.

8. The gas exchange column of claim 7 wherein the means for directing the stripping gas to flow in a tortuous path comprises at least one baffle intermediate the means for supplying the stripping gas and the means for exhausting the stripping gas.

9. The gas exchange column of claim 8 wherein the means for supplying the stripping gas between the adjacent sieve plates and the means for exhausting the stripping gas from between the adjacent sieve plates comprises a truncated edge portion of each sieve plate, the truncated edge portion together with the side wall of the shell defining a stripping gas passageway therebetween.

10. The gas exchange column of claim 9 wherein the means for directing the stripping gas to flow in a tortuous path further comprises an end baffle, the end baffle being attached to the truncated edge portion.

11. The gas exchange column of claim 10 wherein said baffles are perforated.

12. The gas exchange column of claim 7 further comprising a means for reducing pressure within the column, the pressure reducing means being in fluid communication with the top of the column for drawing the stripping gas and removed gas out of the column.

13. The gas exchange column of claim 7 further comprising a stripping gas sparger for introducing the stripping gas into the means for supplying the gas-containing liquid.

14. A gas exchange column for removing gas from a gas-containing liquid using a stripping gas, the gas exchange column comprising:
   an enclosed shell having a side wall defining an inner periphery and having a top and a bottom;
   a means for supplying the gas-containing liquid proximate the top of the shell;
   a means for supplying the stripping gas proximate the bottom of the shell;
   at least two substantially parallel and substantially planar spaced apart perforated sieve plates for receiving the gas-containing liquid thereon, the perforations causing the gas-containing liquid to percolate through the sieve plates and form a discrete flow as the gas-containing liquid passes between the sieve plates, the perforations permitting a flow of the stripping gas through the gas-containing liquid, each sieve plate having an edge portion conforming substantially to the inner periphery of the shell and a truncated edge portion, each sieve plate further having a gas-containing liquid confining lip to prevent the gas-containing liquid from flowing off the truncated portion of the sieve plate, the truncated portion and the side wall of the shell defining a stripping gas passageway therebetween for causing the stripping gas to flow between adjacent sieve plates, each perforated sieve plate being oriented such that the stripping gas passageway is not aligned with the stripping gas passageway of an adjacent sieve plate;
   at least one end baffle conforming substantially to the truncated portion of at least one of the sieve plates and attached proximate thereto, the end baffle extending between one of the sieve plates and at least one adjacent sieve plate, the end baffle, the sieve plate, the adjacent sieve plate and the side wall defining an opening for the flow of the stripping gas therethrough;
   at least one intermediate baffle generally centrally located on at least one of the sieve plates, the intermediate baffle extending between one of the sieve plates and an adjacent sieve plate, the intermediate baffle and the side wall of the shell defining at least one duct for the flow of the stripping gas therethrough.

15. The column for removing gas from a gas-containing liquid using a stripping gas of claim 14 wherein the means for supplying stripping gas is a stripping gas inlet jet, and the column has a plurality of stripping gas inlet jets with at least one being located proximate the bottom of the shell and at least one being located intermediate the top and the bottom of the shell.

16. The column for removing gas from a gas-containing liquid using a stripping gas of claim 14 wherein the end baffle and the intermediate baffle are perforated.

17. The column for removing gas from a gas-containing liquid using a stripping gas of claim 14 further comprising a means for reducing pressure within the column, the pressure reducing means being in fluid communication with the top of said column for drawing the stripping gas and removed gas out of the column.

18. The column for removing gas from a gas-containing liquid using a stripping gas of claim 14 further comprising a stripping gas sparger for introducing the stripping gas into the means for supplying the gas-containing liquid.

19. The gas exchange column of claim 14 wherein the sieve plates are attached to the side wall about their respective edge portions.

20. The gas exchange column of claim 14 wherein:
   each sieve plate has a top and bottom and each sieve plate has an end baffle, the end baffle having an upper portion extending above and between the sieve plate and an adjacent sieve plate above the sieve plate, the sieve plate, the adjacent sieve plate above the sieve plate and the side wall defining a first opening for the flow of stripping gas therethrough, the end baffle further having a lower portion extending below and between the sieve plate and an adjacent sieve plate below the sieve plate, the sieve plate, the adjacent sieve plate below the sieve plate and the side wall defining a second opening for the flow of stripping gas therethrough, the portion of end baffle extending below the sieve plate being diagonally off-set from the portion of the sieve plate extending above the sieve plate;
   each sieve plate further has an intermediate baffle on its top extending between the sieve piate and an adjacent sieve plate above the sieve plate; and
   each sieve plate is about 180° out of alignment with each adjacent sieve plate.

21. The gas exchange column of claim 20 wherein:
   the intermediate baffle, the sieve plate, the adjacent sieve plate above the sieve plate and the side wall of the shell define a single duct, this duct and the first opening defined in part by the upper portion of the end baffle of the sieve plate and a second opening defined in part by the lower portion of the end baffle of the adjacent sieve plate above the sieve plate being aligned such that the stripping gas enters the first opening defined in part by the upper portion of the end baffle of the sieve plate and flows through duct and then out the second opening defined in part by the lower portion of the end baffle of the adjacent sieve plate above the sieve plate in a generally "U"-shaped flow pattern.

22. The gas exchange column of claim 21 wherein:
   the intermediate baffle the sieve plate, the adjacent sieve plate above the sieve plate and the side wall of the shell define two ducts of unequal size such that the majority of the stripping gas flows in the generally "U"-shaped flow pattern and the remaining stripping gas flows through the smaller duct in a generally linear flow path.

* * * * *